United States Patent
Kurahashi et al.

(10) Patent No.: US 10,486,661 B2
(45) Date of Patent: Nov. 26, 2019

(54) STOP CONTROL DEVICE

(71) Applicant: HONDA MOTOR CO., LTD., Tokyo (JP)

(72) Inventors: Yukinori Kurahashi, Wako (JP); Kei Oshida, Wako (JP); Masayuki Nakatsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 72 days.

(21) Appl. No.: 15/807,780

(22) Filed: Nov. 9, 2017

(65) Prior Publication Data
US 2018/0134262 A1    May 17, 2018

(30) Foreign Application Priority Data

Nov. 14, 2016  (JP) ................. 2016-221197

(51) Int. Cl.
*B60K 28/06* (2006.01)
*B60T 7/14* (2006.01)
(Continued)

(52) U.S. Cl.
CPC ............... *B60T 7/14* (2013.01); *B60K 28/06* (2013.01); *B60K 35/00* (2013.01); *B60W 50/14* (2013.01);
(Continued)

(58) Field of Classification Search
CPC ..... B60K 28/06; B60K 2370/172; B60T 7/14; B60T 7/12; B60W 50/12; B60W 50/14;
(Continued)

(56) References Cited

U.S. PATENT DOCUMENTS

| 2012/0025993 A1* | 2/2012 | Akiyama | A61B 5/18 340/576 |
| 2013/0018549 A1* | 1/2013 | Kobana | B60K 28/06 701/41 |
| 2018/0111628 A1* | 4/2018 | Tamagaki | B60Q 1/46 |

FOREIGN PATENT DOCUMENTS

| JP | 2011-57134 A | 3/2011 |
| JP | 2012-228954 A | 11/2012 |

(Continued)

OTHER PUBLICATIONS

Office Action dated Jul. 3, 2018, issued in counterpart Japanese Application No. 2016-221197, with English machine translation. (7 pages).

*Primary Examiner* — Keith J Frisby
(74) *Attorney, Agent, or Firm* — Westerman, Hattori, Daniels & Adrian, LLP

(57) ABSTRACT

A stop control device includes: a stop intention detection unit 170 that detects a stop intention of a driver; an unable-to-drive state detection unit 172 that detects that the driver is in an unable-to-drive state; a stop control unit 176 that performs automatic stop control in which a vehicle is decelerated and stopped, based on whether the stop intention is detected by the stop intention detection unit and/or whether the unable-to-drive state is detected by the unable-to-drive state detection unit; and a state display unit 174 that shows, on a display 144, information on whether it has been determined to activate the automatic stop control, a state of the control, and/or whether it has been determined to cancel the control.

8 Claims, 11 Drawing Sheets

(51) Int. Cl.
*B60W 50/14* (2012.01)
*B60K 35/00* (2006.01)

(52) U.S. Cl.
CPC .. *B60K 2370/172* (2019.05); *B60W 2050/146* (2013.01); *B60W 2540/10* (2013.01); *B60W 2540/26* (2013.01); *B60W 2710/18* (2013.01); *B60Y 2302/05* (2013.01)

(58) Field of Classification Search
CPC ......... B60W 2540/26; B60W 2540/10; B60W 2050/146; B60W 2040/0818; B60W 2040/0827; B60W 2710/18; B60Y 2302/05
USPC ............................ 701/70; 180/272; 340/576
See application file for complete search history.

(56) References Cited

FOREIGN PATENT DOCUMENTS

| | | |
|---|---|---|
| JP | 2015-207264 A | 11/2015 |
| WO | 2010/122650 A1 | 10/2010 |

\* cited by examiner

STOP CONTROL DEVICE

CROSS-REFERENCE OF RELATED APPLICATION

This application claims priority of Japanese Patent Application No. 2016-221197 filed in Japan on Nov. 14, 2016, the entire contents of which are incorporated herein by reference.

TECHNICAL FIELD

The present invention relates to a stop control device that stops a vehicle automatically, in the event of an emergency in which the driver is no longer able to drive the vehicle while the vehicle is running.

BACKGROUND OF THE INVENTION

When a driving a vehicle, an emergency may arise in which the driver of the vehicle is no longer able to operate the vehicle due to his/her health condition such as sudden symptom occurrence or worsening of an illness. Japanese Patent Application No. 2015-207264 discloses a device that stops a vehicle automatically by detecting occurrence of such an emergency. In this device, the driver pushes a predetermined emergency stop switch when he/she intends to stop the vehicle (stop intention). The device detects the driver's stop intention by the pushing of the emergency stop switch, and also determines that the driver is in a state where he/she is unable to drive (hereinafter referred to as "unable-to-drive state") when a predetermined driving operation such as an acceleration operation is not performed for a predetermined time or longer.

Then, the device determines whether an emergency has occurred according to both of presence or absence of a stop intention and presence or absence of the unable-to-drive state. Upon detection of both of the stop intention and the unable-to-drive state, the device determines that an emergency has occurred and automatically stops the vehicle at a predetermined deceleration speed. Upon detection of only one of the stop intention and the unable-to-drive state, the device determines that it is highly probable that an emergency has occurred and stops the vehicle at a lower deceleration speed than the aforementioned predetermined deceleration speed. Thus, the device prevents an immediate automatic stop of the vehicle due to erroneous detection of an emergency when no emergency has occurred, and also prevents continuance of normal travel due to erroneous detection that no emergency has occurred when an emergency has occurred. Japanese Patent Application No. 2015-207264 also discloses that the device cancels automatic stop control, when it detects that the driver has performed a predetermined driving operation for a predetermined time while performing automatic stop control.

The above conventional stop control device is capable of appropriately detecting an emergency and stopping a vehicle safely. However, since it is difficult for the driver to accurately sense the time period of a driving operation such as an acceleration operation, the driver may have difficulty in knowing whether it has been determined to activate the automatic stop function or whether it has been determined to cancel the function in the device, and how to initiate a desired operation (e.g., activation or cancellation of the function). As a result, an unexpected start of automatic stop control caused by an unintentionally long no driving time, or the inability of appropriately determining the required amount of driving operation time for canceling automatic stop control after the start of the control may confuse the driver. Such confusion is more likely to happen when the driver has the aforementioned sudden or urgent problem concerning his/her health condition, and an erroneous operation by the confused driver may lead to a secondary disaster.

SUMMARY OF THE INVENTION

Against this background, in a stop control device that stops a vehicle automatically in the event of an emergency in which the driver is no longer able to drive the vehicle due to his/her health condition or the like, it is necessary to suppress the driver's confusion that may be caused in relation to an activation or cancellation timing of automatic stop control.

A first aspect of the present invention is a stop control device including: a stop intention detector that detects a stop intention of a driver; an unable-to-drive state detector that detects that the driver is in an unable-to-drive state; a stop controller that performs automatic stop control in which a vehicle is decelerated and stopped, based on whether the stop intention is detected by the stop intention detector and/or whether the unable-to-drive state is detected by the unable-to-drive state detector; and a state display part (a state display device) that shows, on a display, information on whether it has been determined to activate the automatic stop control, a state of the control, and/or whether it has been determined to cancel the control.

According to another aspect of the present invention, the unable-to-drive detector determines whether the driver is in an unable-to-drive state based on a state of an accelerator operation by the driver.

According to another aspect of the present invention, the stop intention detector detects a stop intention of the driver based on whether a predetermined switch provided inside a vehicle compartment is turned on.

According to another aspect of the present invention, the stop controller starts deceleration at a first deceleration speed upon detection of any one of the stop intention and the unable-to-drive state, and starts deceleration at a second deceleration speed higher than the first deceleration speed upon detection of both of the stop intention and the unable-to-drive state.

According to another aspect of the present invention, the state display part shows, on the display, a required operation for activation or cancellation of the automatic stop control in the current state.

According to another aspect of the present invention, the state display part shows, on the display, a remaining time for which to maintain the required operation before activation or cancellation of the automatic stop control in the current state.

Another aspect of the present invention is a stop control device including: a communication interface for communicating with an onboard device; and a processor that processes data acquired from the onboard device through the communication interface, in which the processor is configured to detect a stop intention of a driver and/or an unable-to-drive state of the driver based on the data, perform automatic stop control in which a vehicle is decelerated and stopped, based on whether the stop intention is detected and/or whether the unable-to-drive state is detected, and show, on a display, information on whether it has been determined to activate the automatic stop control, a state of the control, and/or whether it has been determined to cancel the control.

Another aspect of the present invention is a vehicle including any one of the above-mentioned stop control devices.

Another aspect of the present invention is a method of automatically stopping a vehicle including the steps of: acquiring data from an onboard device through a communication interface; detecting a stop intention of a driver and/or an unable-to-drive state of the driver based on the acquired data; performing automatic stop control in which a vehicle is decelerated and stopped, based on whether the stop intention is detected and/or whether the unable-to-drive state is detected; and showing, on a display, information on whether it has been determined to activate the automatic stop control, a state of the control, and/or whether it has been determined to cancel the control.

DETAILED DESCRIPTION OF EMBODIMENTS OF THE INVENTION

Hereinafter, an embodiment of the present invention will be described with reference to the drawings.

Figure 1:
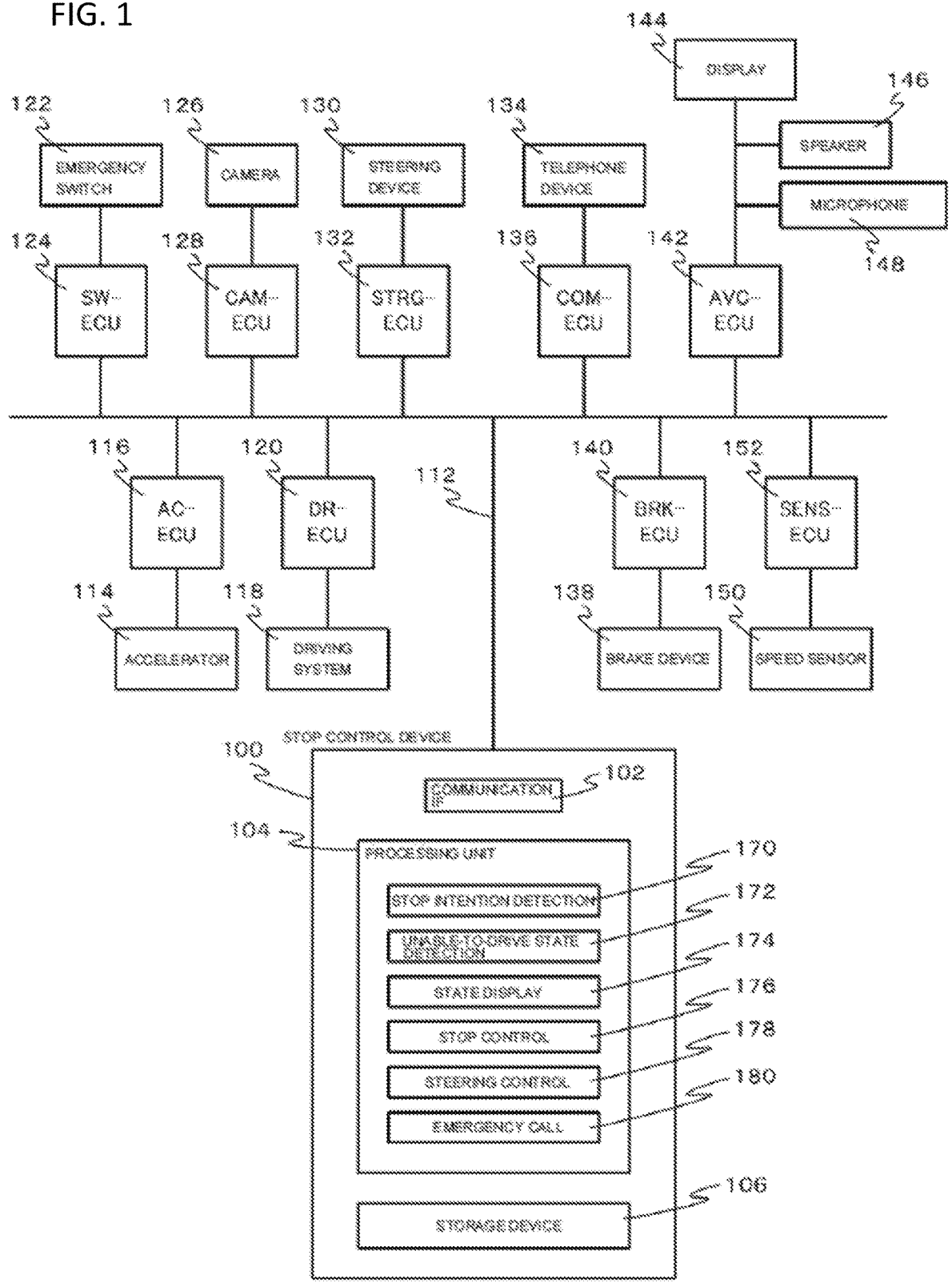
FIG. 1 is a block diagram illustrating a configuration of a stop control device of an embodiment of the present invention.

FIG. 1 is a diagram illustrating a configuration of a stop control device of an embodiment of the present invention.

A stop control device 100 is configured as an electronic control unit (ECU) installed in a vehicle, and includes: a wire communication interface (wire communication IF) 102 for performing data communication with another ECU 116 and the like through a bus 112; a processing unit 104; and a storage device 106. The wire communication IF 102 is a transceiver that performs communication according to the CAN (control area network) standard. Hereinafter, a vehicle for which the stop control device 100 performs automatic stop control is referred to as a host vehicle or vehicle.

The stop control device 100 acquires data such as a pressing amount (operation amount) of an accelerator pedal 114 from an accelerator control ECU (AC-ECU) 116 that detects an operation of the accelerator pedal 114 by the driver, for example, through the wire communication IF 102, and communicates with a drive control ECU (DC-ECU) 120 that controls an operation of a vehicle driving system 118 to control a vehicle driving force to be generated in the vehicle driving system 118. The vehicle driving system 118 may be en electric motor or an internal combustion engine that gives a propulsive force to the vehicle, for example. Note that while the driver controls the driving force of the vehicle driving system 118 by operating the accelerator pedal 114 in the embodiment, an accelerator operation device including an arbitrary operation part such as an operation lever may be used instead of the accelerator pedal 114.

The stop control device 100 also acquires information related to a push state of an emergency switch 122 from a switch control ECU (SW-ECU) 124 that detects a push state of the emergency switch 122 provided inside a vehicle compartment, and acquires an image through a camera control ECU (CAM-ECU) 128 that controls a camera 126 taking an image of the vehicle front. Moreover, the stop control device 100 communicates with a steering control ECU (STRG-ECU) 132 that controls a steering device 130, to control the steering device 130 to travel within a lane in front of the vehicle recognized from an image acquired through the CAM-ECU 128.

The stop control device 100 also communicates with a communication control ECU (COM-ECU) 136 that controls a telephone device 134, to call an emergency critical care center in an emergency and ensure communication by telephone between the occupant of the vehicle and the center. The stop control device 100 also communicates with a brake control ECU (BRK-ECU) 140 that controls a brake device 138 including a hydraulic brake and an electric parking brake, to control the hydraulic brake to decelerate the vehicle at a desired deceleration speed, and also to drive the electric parking brake to set the vehicle to a stopped state (parked state).

The stop control device 100 also communicates with an audio-visual device ECU (AVC-ECU) 142, to output an image to a display 144, output voice to a speaker 146, and/or receive a voice signal from a microphone 148. Note that the display 144, speaker 146, and microphone 148 are provided inside the vehicle compartment, and provide image information and voice information to the driver and/or the occupant, and acquire voice from the driver and/or the occupant.

Further, the stop control device 100 receives a speed detection signal from a speed sensor 150 that detects the speed of the vehicle, through a sensor monitoring ECU (SENS-ECU) 152, and determines whether the vehicle has stopped, for example.

Figure 2:
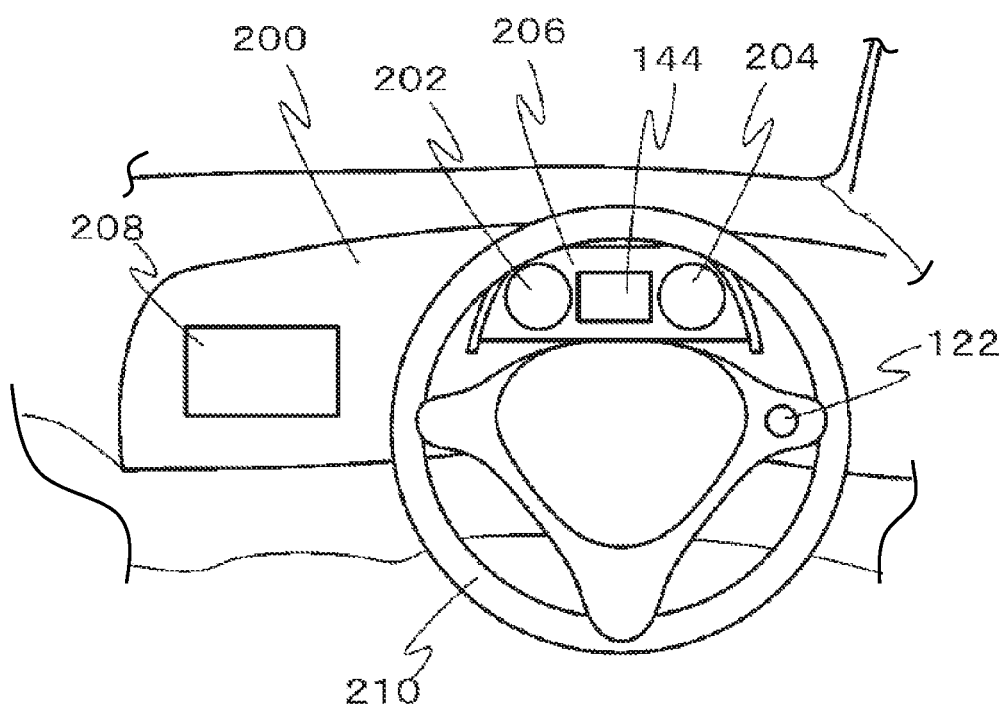
FIG. 2 is an example of a layout of the inside of a vehicle compartment of a vehicle controlled by the stop control device of the present invention.

FIG. 2 is a diagram illustrating an example of a layout inside the vehicle compartment. An instrument panel 200 of a driver's seat has a meter panel 206 including a speedometer 202 and a tachometer 204, and a touch panel 208 of a navigation system, for example. The display 144 is configured as a so-called multi information display (MID) incorporated in a meter panel 206, for example.

With this configuration, the driver can easily see an image on the display 144 behind a steering wheel 210 that the driver is holding, through the steering wheel 210. Note that instead of using the multi information display in the meter panel 206 as the display 144, the touch panel 208 of the navigation system or a display (not shown) of a so-called display audio system provided in the instrument panel 200 may be used as the display 144.

The emergency switch 122 is provided as a push button switch, for example, in the steering wheel 210. In the embodiment, the driver transmits a stop intention to the stop control device 100 by pushing the emergency switch 122, when he/she is no longer able to perform a driving operation such as a braking operation due to sudden symptom occurrence or worsening of an illness, for example.

Referring back to FIG. 1, the processing unit 104 of the stop control device 100 is a computer that has a processor such as a CPU (central processing unit), a ROM (read only memory) into which a program is written, and a RAM (random access memory) for temporarily storing data, for example. The processing unit includes a stop intention detection unit 170, an unable-to-drive state detection unit 172, a state display unit 174, a stop control unit 176, a steering control unit 178, and an emergency call unit 180.

The above units included in the processing unit 104 are implemented by executing a program by the processing unit 104 which is a computer, and the computer program may be stored in an arbitrary computer readable storage medium. Instead or in addition to this, all or some of the above units may each be configured of hardware including one or more electronic circuit components.

The stop intention detection unit 170 refers to the SW-ECU 124 at predetermined intervals for the push state of the emergency switch 122, to acquire information on the push state. When the emergency switch 122 is pushed, the stop intention detection unit outputs a signal (stop intention detection signal) indicating pushing of the emergency switch 122 to the stop control unit 176. Instead, when the emergency switch 122 is pushed, the SW-ECU 124 may transmit a signal (SW push signal) indicating pushing of the emergency switch 122 to the stop intention detection unit 170. Then, upon receipt of the SW push signal, the stop intention detection unit 170 may output a stop intention detection signal to the stop control unit 176.

The emergency switch 122 is a push button switch, for example. When the push button is pushed once, the SW-ECU 124 determines that the emergency switch 122 has transitioned to and is held in a pushed state, for example. It may be determined (by SW-ECU 124) that the pushed state has transitioned to and is held in a not-pushed state, when the emergency switch 122 is pushed again, when a predetermined time period passes after transitioning to the pushed state, or when later-mentioned automatic stop control is completed.

The unable-to-drive state detection unit 172 acquires an operation amount (pressing amount) of the accelerator pedal 114 at predetermined intervals through the AC-ECU 116. When detecting that the operation amount of the accelerator pedal 114 is 0, the unable-to-drive state detection unit 172 starts measurement of the time (accelerator not-operated time) when the operation amount is 0. After start of the measurement, the unable-to-drive state detection unit 172 outputs a signal (accelerator non operation-start signal) indicating the start of accelerator non operation, when the accelerator not-operated time is continued for a first predetermined time (e.g., 0.5 seconds). Additionally, the unable-to-drive state detection unit 172 determines that the driver is in an unable-to-drive state when the accelerator not-operated time is continued for a second predetermined time (e.g., three seconds) longer than the first predetermined time, and outputs a signal (unable-to-drive state detection signal) indicating the unable-to-drive state of the driver to the stop control unit 176.

Then, after detecting the start of accelerator non operation, when detecting that the operation amount of the accelerator pedal 114 is no longer 0, the unable-to-drive state detection unit 172 starts measurement of the time (accelerator operated time) when the operation amount is not 0. Thereafter, when the accelerator operated time exceeds a third predetermined time (e.g., 0.5 seconds), the unable-to-drive state detection unit outputs a signal (accelerator operation start signal) indicating the start of accelerator operation to the stop control unit 176.

The stop control unit 176 performs automatic stop control in which the deceleration speed of the vehicle is controlled to stop the vehicle automatically, based on whether a stop intention detection signal is received from the stop intention detection unit 170, and/or whether an unable-to-drive state detection signal is received from the unable-to-drive state detection unit 172.

More specifically, upon receipt of any one of the stop intention detection signal from the stop intention detection unit 170 and the unable-to-drive state detection signal from the unable-to-drive state detection unit 172, the stop control unit 176 starts automatic stop control, and controls the brake device 138 and the driving system 118 through the BRK-ECU 140 and the DC-ECU 120 to decelerate at a first deceleration speed G1. Hereinafter, deceleration at the first deceleration speed is also referred to as "automatic braking."

After starting automatic braking (deceleration at first deceleration speed), when both of the stop intention detection signal and the unable-to-drive state detection signal are received, the stop control unit 176 controls the brake device 138 and the driving system 118 to decelerate at a second deceleration speed G2 (G2 having a larger absolute value than G1 when the deceleration speed is indicated by a negative quantity) higher than the first deceleration speed G1. Hereinafter, deceleration at the second deceleration speed is also referred to as "emergency braking."

Upon receipt of an accelerator operation start signal from the unable-to-drive state detection unit 172 while performing automatic braking (deceleration at first deceleration speed), the stop control unit 176 cancels automatic braking and returns the vehicle to its normal driving state. Upon receipt of an accelerator operation start signal while performing emergency braking, the stop control unit 176 measures the time elapsed after receipt of the signal. If the elapsed time exceeds a fourth predetermined time (e.g., four seconds) without receiving an accelerator non operation-start signal (i.e., if accelerator operation is continued for fourth predetermined time or longer), the stop control unit cancels emergency braking and returns the vehicle to its normal driving state. Hence, the driver can cancel once activated automatic braking and emergency braking by an accelerator operation.

When the vehicle stops as a result of deceleration by automatic braking and/or emergency braking, the stop control unit 176 actuates an electric parking brake (EPB) which is a part of the brake device 138 through the BRK-ECU 140, to set the vehicle to a parked state.

Moreover, the stop control unit 176 outputs information indicating the current state of the vehicle and information indicating the state of automatic stop control to the state display unit 174, the steering control unit 178, and/or the emergency call unit 180, based on information acquired from the stop intention detection unit 170 and/or the unable-to-drive state detection unit 172.

More specifically, the stop control unit 176 outputs the following information.

Information C1: "Information indicating that automatic braking (deceleration at first deceleration speed) has been started by detection of pushing of the emergency switch when the unable-to-drive state is not detected"

Information C2: "Information indicating that accelerator non operation has been started after pushing of the emergency switch"

Information C3: "Information indicating that emergency braking (deceleration at second deceleration speed) has been started"

Information C4: "Information indicating that automatic stop of the vehicle has been completed"

Information C5: "Information indicating that an accelerator operation has been started during emergency braking"

Information C6: "Information indicating that automatic stop control has been cancelled"

Information C7: "Information indicating that the start of accelerator non operation has been detected when the emergency switch is not pushed"

Information C8: "Information indicating that automatic braking (deceleration at first deceleration speed) has been started by detection of an unable-to-drive state when pushing of the emergency switch is not detected"

Note that these pieces of information may be exchanged by assigning a corresponding signal to each of the above pieces of information, and outputting the signal corresponding to the information to be sent to the destination unit, for example.

Upon receipt of information (aforementioned information C1, C3, or C8) indicating that automatic braking or emergency braking has been started from the stop control unit 176, the steering control unit 178 controls the steering device 130, so that the vehicle runs along the current lane. More specifically, the steering control unit 178 acquires an image of the front of the vehicle from the camera 126 through the CAM-ECU 128, performs image recognition processing on the image to recognize the current lane of the vehicle, and controls the steering device 130 through the STRG-ECU 132, so that the vehicle runs along the recognized current lane.

Upon receipt of information (aforementioned information C1, C3, or C8) indicating that automatic braking or emergency braking has been started from the stop control unit 176, the emergency call unit 180 uses a telephone number of an emergency critical care center pre-stored in the storage device 106 to call the emergency critical care center by the telephone device 134, and ensures communication between the driver or occupant of the vehicle and the emergency critical care center.

The state display unit 174 displays, on the display 144 through the AVC-ECU 142, whether it has been determined to activate automatic stop control, the state of the control, whether it has been determined to cancel the control, information on the operation required for the driver to activate or cancel automatic stop control, and/or information on the remaining time for which to maintain the operation for activation or cancellation of automatic stop control, based on information (i.e., aforementioned information C1 to C8) related to the vehicle state or control state received from the stop control unit 176.

FIGS. 3A to 3H are diagrams illustrating examples of a screen that the state display unit 174 displays on the display 144. Each of screens I to VIII illustrated in FIGS. 3A to 3H is an example of a screen that the state display unit 174 displays on the display 144 upon receipt of the aforementioned information C1 to C8.

Hereinafter, operations of the state display unit 174 when receiving the information C1 to C8 from the stop control unit 176 and displaying them on the display 144 will be described, by simulating operations by the driver.

First, assume that the emergency switch 122 is pushed when the driver is performing an accelerator operation during a normal driving state (i.e., when none of pushing of emergency switch 122 or unable-to-drive state is detected). At this time, the stop control unit 176 receives a stop intention detection signal from the stop intention detection unit 170, starts automatic braking (deceleration at first deceleration speed), and also outputs "information indicating that automatic braking has been started by detection of pushing of the emergency switch when the unable-to-drive state is not detected (C1)" to the state display unit 174. Then, upon receipt of the information C1, the state display unit 174 displays screen I illustrated in FIG. 3A on the display 144.

Screen I shows: a displayed text "Automatic braking activated" 300 indicating that deceleration at the first deceleration speed (automatic braking) has been activated; a displayed text "Automatic braking has been started. Release accelerator pedal for emergency stop" 302; and an icon 304 indicating release of the accelerator pedal 114. Hence, the driver can easily grasp the current state of the vehicle, in which automatic braking has been started, and the operation required for the driver to activate emergency braking.

Thereafter, when the driver releases the accelerator pedal 114, the stop control unit 176 receives an accelerator non operation-start signal from the unable-to-drive state detection unit 172, and transmits "information indicating that accelerator non operation has been started after pushing of the emergency switch" (C2) to the state display unit 174. Upon receipt of the information C2, the state display unit 174 displays screen II illustrated in FIG. 3B on the display 144.

Figure 3A:
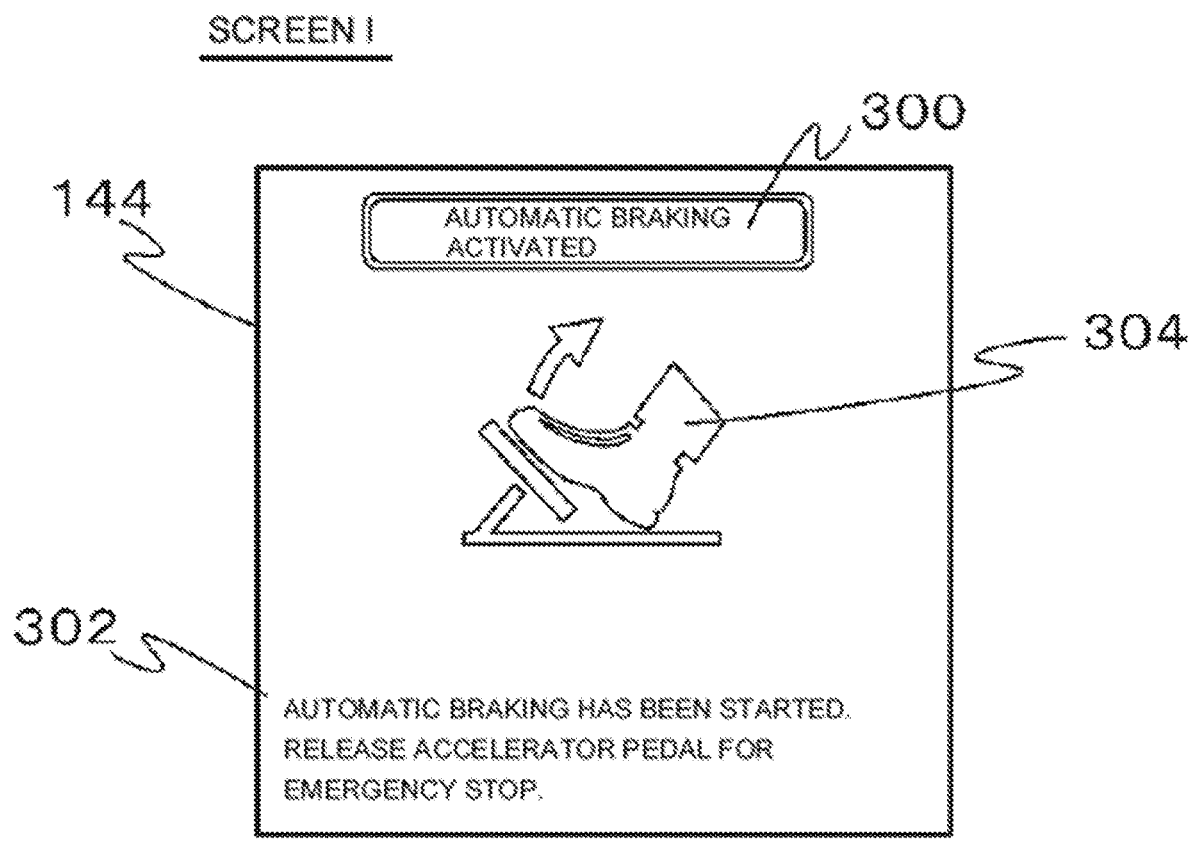
FIG. 3A is a diagram illustrating an example of a screen displayed on a display of the stop control device of the present invention.
Figure 3B:
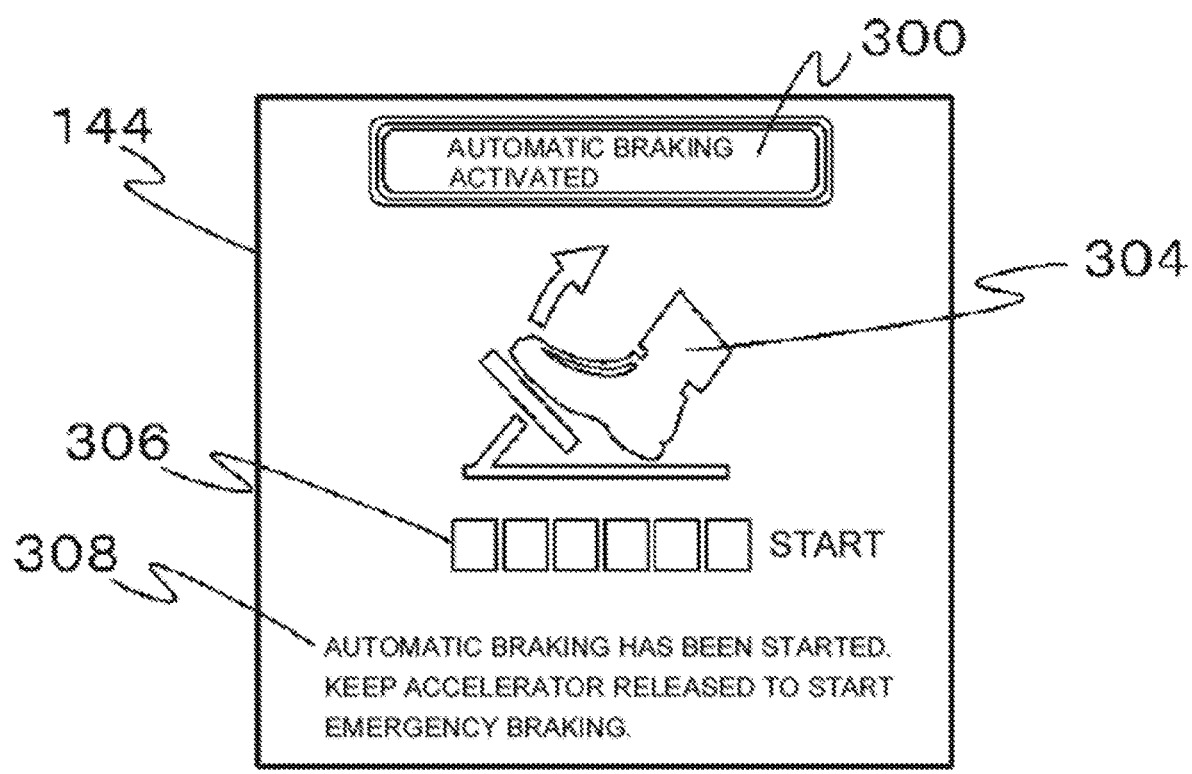
FIG. 3B is a diagram illustrating an example of a screen displayed on the display of the stop control device of the present invention.

Although screen II has a similar configuration as screen I of FIG. 3A, it also shows: an icon 306 indicating the remaining time for which to maintain the accelerator non operation state before start of emergency braking; and a displayed text "Automatic braking has been started. Keep accelerator pedal released to start emergency braking" 308 instead of the displayed text 302. In the example of FIG. 3B, the icon 306 is configured of six lamps (six squares in FIG. 3B) arranged in a row, and the lamps respectively indicate that the remaining time for which to maintain the accelerator non operation state before start of emergency braking is, from the left in this order, 3 to 2.5 seconds, 2.5 to 2 seconds, 2 to 1.5 seconds, 1.5 to 1.0 seconds, 1.0 to 0.5 seconds, and less than 0.5 seconds.

The state display unit 174 measures the time elapsed after receipt of the above information C2, calculates the above-mentioned remaining time by subtracting the measured time from the second predetermined time, and lights a lamp corresponding to the calculated remaining time. Accordingly, the positions of lit lamps move to the right (side on which "start" is displayed in screen II of FIG. 3B) with the elapse of time. As a result, the driver can intuitively know the required operation and the remaining time for which to maintain the operation before start of emergency braking.

When the remaining time reaches zero, the stop control unit 176 receives an unable-to-drive state detection signal from the unable-to-drive state detection unit 172, in addition to the already-received stop intention detection signal. Upon receipt of the unable-to-drive state detection signal, the stop control unit 176 starts emergency braking (deceleration at second deceleration speed), and also outputs "information indicating that emergency braking has been started" (C3) to the state display unit 174. Then, upon receipt of the information C3, the state display unit 174 displays screen III illustrated in FIG. 3C on the display 144.

Screen III shows: a displayed text "Emergency braking activated" 310; a displayed text "Emergency braking has been started. Operate accelerator pedal to cancel emergency braking." 312; and an icon 314 indicating pressing of the accelerator pedal 114. Hence, the driver can easily recognize the current state of the vehicle, in which emergency braking has been started, and the operation required for the driver to cancel emergency braking. Note that in order for the driver to easily determine whether the displayed operation of the accelerator pedal is related to activation and maintenance of automatic stop control or is related to cancellation of automatic stop control, different colors may be used for the icon 314 related to cancellation of automatic stop control and the icon 304 related to activation of automatic stop control.

Next, if the vehicle stops without pressing of the accelerator pedal 114 by the driver (i.e., without cancellation of emergency braking), the stop control unit 176 sets the vehicle to a parked state, and also outputs "information indicating that automatic stop of the vehicle has been completed" (C4) to the state display unit 174. Then, upon receipt of the information C4, the state display unit 174 displays screen IV illustrated in FIG. 3D on the display 144. Screen IV shows a displayed text "Automatic stop completed" 316. Hence, the driver understands that the vehicle has stopped and is now in a parked state.

Figure 3C:
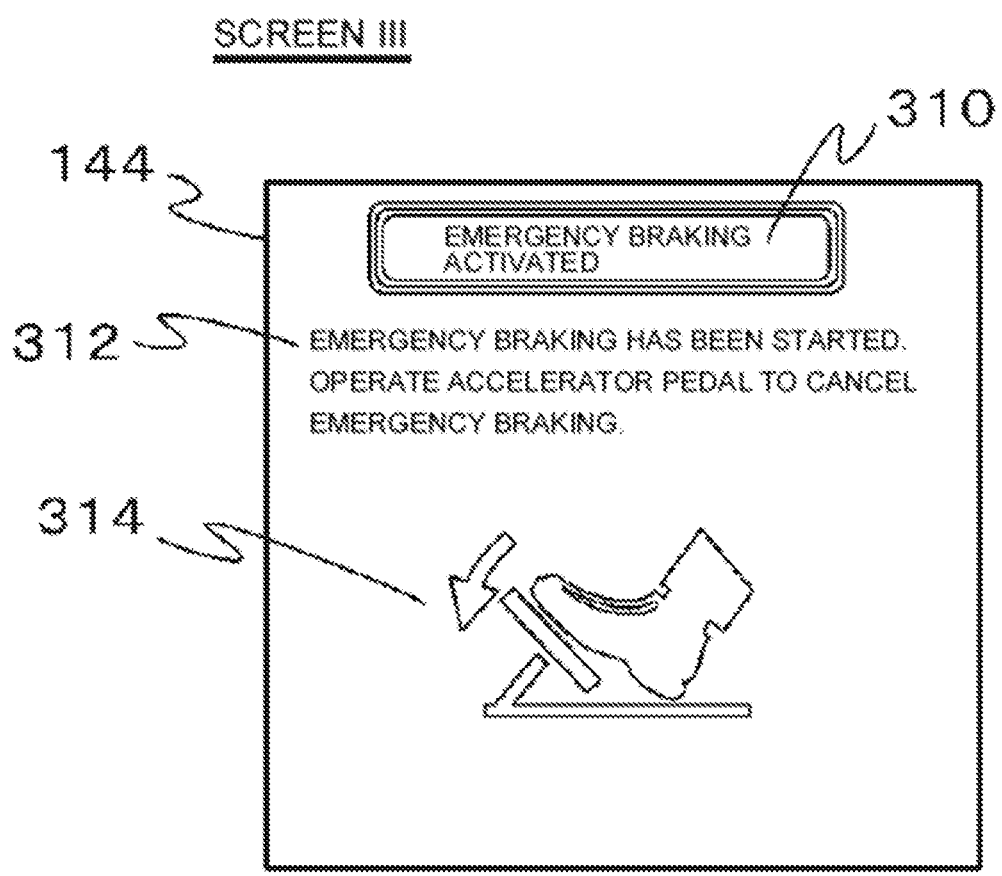
FIG. 3C is a diagram illustrating an example of a screen displayed on the display of the stop control device of the present invention.
Figure 3D:
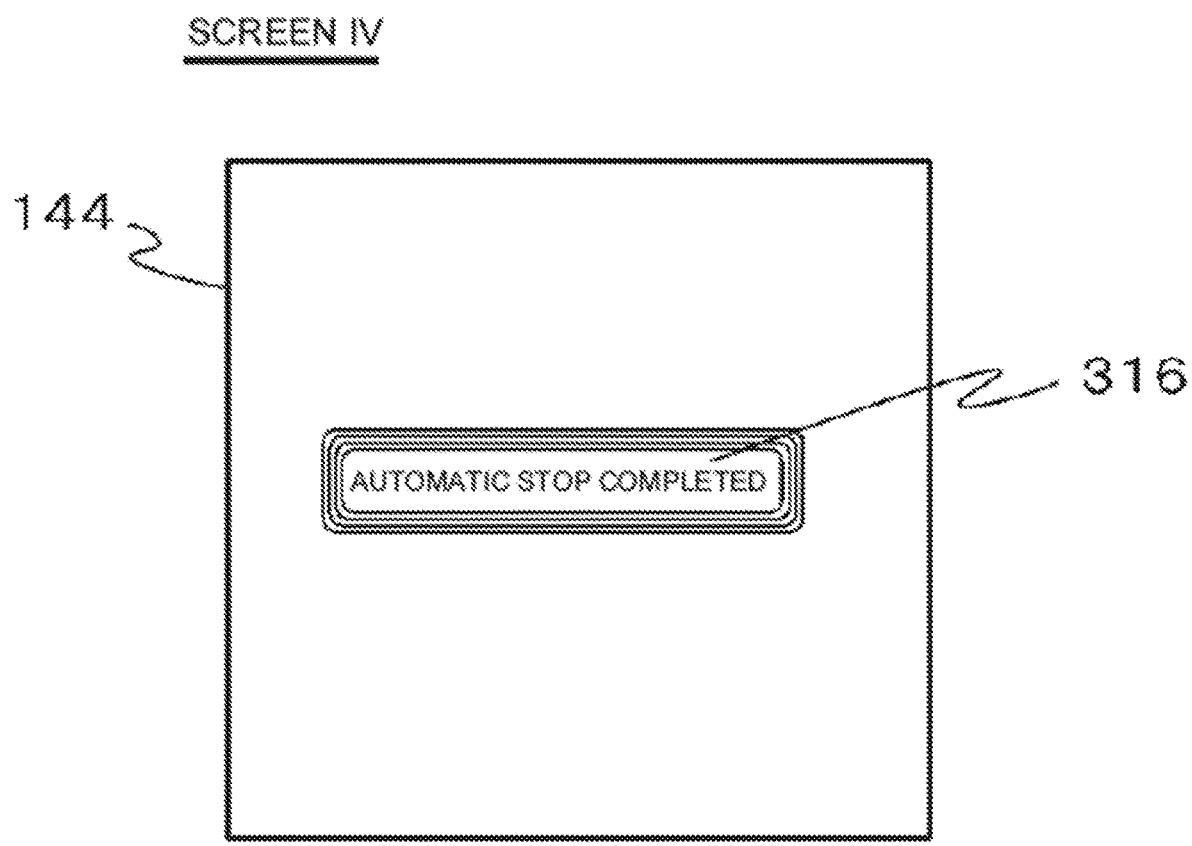
FIG. 3D is a diagram illustrating an example of a screen displayed on the display of the stop control device of the present invention.

On the other hand, after displaying screen III of FIG. 3C on the display 144, if the driver operates the accelerator pedal before stoppage of the vehicle, the stop control unit 176 receives an accelerator operation start signal from the unable-to-drive state detection unit 172, and transmits "information indicating that an accelerator operation has been started during emergency braking" (C5) to the state display unit 174. Then, upon receipt of the information C5, the state display unit 174 displays screen V illustrated in FIG. 3E on the display 144.

Figure 3E:
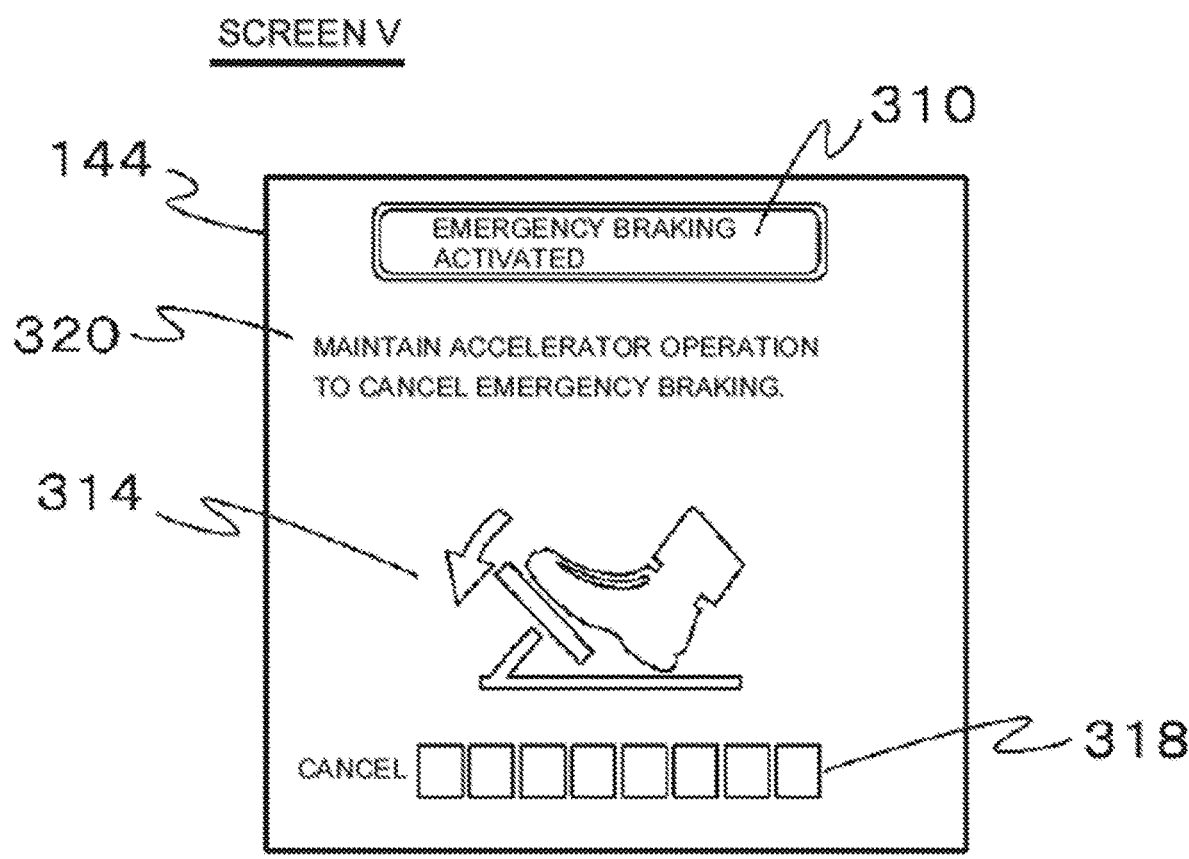
FIG. 3E is a diagram illustrating an example of a screen displayed on the display of the stop control device of the present invention.
Figure 3F:
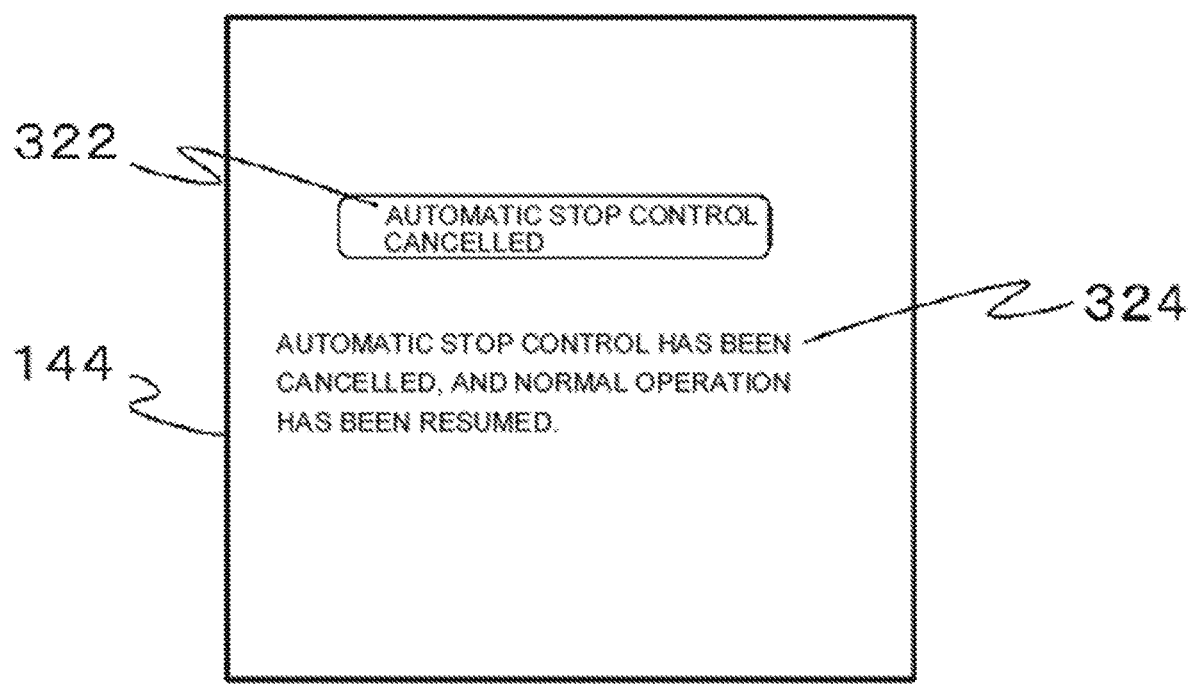
FIG. 3F is a diagram illustrating an example of a screen displayed on the display of the stop control device of the present invention.

Although screen V of FIG. 3E has a similar configuration as screen III of FIG. 3C, it also shows: an icon 318 indicating the remaining time for which to maintain the accelerator operated state before cancellation of emergency braking; and a displayed text "maintain accelerator operation to cancel emergency braking" 320 instead of the displayed text 312. In the example of FIG. 3E, the icon 318 is configured of eight lamps (eight squares in FIG. 3E) arranged in a row, and the lamps respectively indicate that the remaining time for which to maintain the accelerator operated state before cancellation of automatic stop control is, from the right in this order, 4 to 3.5 seconds, 3.5 to 3 seconds, 3 to 2.5 seconds, 2.5 to 2 seconds, 2 to 1.5 seconds, 1.5 to 1.0 seconds, 1.0 to 0.5 seconds, and less than 0.5 seconds.

The state display unit 174 measures the time elapsed after receipt of the above information C5, calculates the above-mentioned remaining time by subtracting the measured time from the fourth predetermined time, and lights a lamp corresponding to the calculated remaining time. Accordingly, the positions of lit lamps move to the left (side on which "cancel" is displayed in screen V of FIG. 3E) with the elapse of time. As a result, the driver can intuitively know the required operation and the remaining time for which to maintain the operation before cancellation of emergency braking.

If the accelerator operation by the driver is maintained for longer than the fourth predetermined time in the above state, the stop control unit 176 cancels emergency braking to return the vehicle to the normal driving state, and also transmits "information indicating that automatic stop control cancelled" (C6) to the state display unit 174. Then, upon receipt of the information C6, the state display unit 174 displays screen VI illustrated in FIG. 3F on the display 144. Screen VI shows: a displayed text "Automatic stop control has been cancelled" 322; and a displayed text "Automatic stop control has been cancelled, and normal operation has been resumed" 324. As a result, the driver can intuitively know that execution of the automatic stop control function has been cancelled, and the vehicle has been returned to the normal driving state.

On the other hand, if the driver keeps the accelerator operation amount at zero without pushing the emergency switch 122 over the first predetermined time in the normal driving state, the stop control unit 176 receives an accelerator non operation-start signal from the unable-to-drive state detection unit 172, and transmits "information indicating that the start of accelerator non operation has been detected when the emergency switch is not pushed" (C7) to the state display unit 174. Then, upon receipt of the information C7, the state display unit 174 displays screen VII illustrated in FIG. 3G on the display 144.

Screen VII shows: a displayed text "Preparing automatic braking" 326 indicating that the start of automatic stop control is being prepared; a displayed text "Keep accelerator released for automatic stop. Push emergency switch as well for emergency stop." 328; the icon 304 indicating release of the accelerator pedal 114; an icon 330 indicating pressing of the emergency switch; and the icon 306 indicating the remaining time for which to maintain the accelerator non operation state before start of automatic braking. Hence, the driver can easily recognize the required operation and the remaining time for which to maintain the accelerator non operation state before start of automatic braking and start of emergency braking.

Figure 3G:
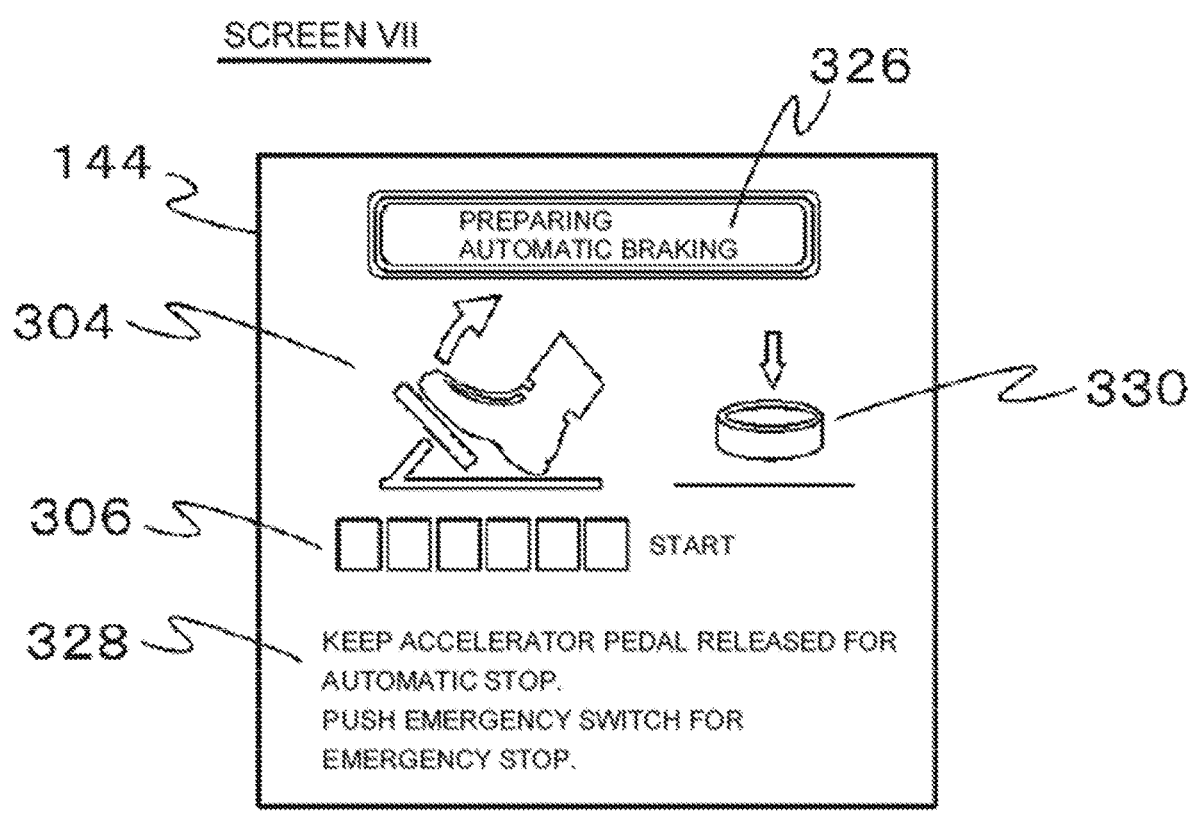
FIG. 3G is a diagram illustrating an example of a screen displayed on the display of the stop control device of the present invention.

Thereafter, if the driver pushes the emergency switch 122 before the aforementioned remaining time reaches zero (before the lamp on the right end in FIG. 3G is lit and turned off) while maintaining the accelerator non operation state, the stop control unit 176 receives a stop intention detection signal from the stop intention detection unit 170, starts automatic braking (deceleration at first deceleration speed), and transmits "information indicating that automatic braking has been started by detection of pushing of the emergency switch when the unable-to-drive state is not detected" (C1) to the state display unit 174. Then, upon receipt of the information C1, the state display unit 174 displays screen II illustrated in FIG. 3B on the display 144. The progression in the screen of the display 144 after showing screen II of FIG. 3B is as described in the above explanation of screen II.

On the other hand, after displaying screen VII of FIG. 3G, if the aforementioned remaining time reaches zero while maintaining the accelerator non operation state without pushing of the emergency switch 122 by the driver, the stop control unit 176 receives an unable-to-drive state detection signal from the unable-to-drive state detection unit 172, starts automatic braking (deceleration at first deceleration speed), and also transmits "information indicating that automatic braking (deceleration at first deceleration speed) has been started by detection of an unable-to-drive state when pushing of the emergency switch is not detected" (C8) to the state display unit 174. Then, upon receipt of the information C8, the state display unit 174 displays screen VIII illustrated in FIG. 3H on the display. Screen VIII shows: the displayed text "Automatic braking activated" 300 indicating that automatic stop control at the first deceleration speed has been started; a displayed text "Automatic braking has been started. Push emergency switch for emergency stop. Operate accelerator pedal to cancel automatic braking." 332; and the icon 330 indicating pushing of the emergency switch. Hence, the driver can easily know the current state of the vehicle, in which automatic braking has been activated, and the required operation for starting emergency braking in the current state.

Figure 3H:
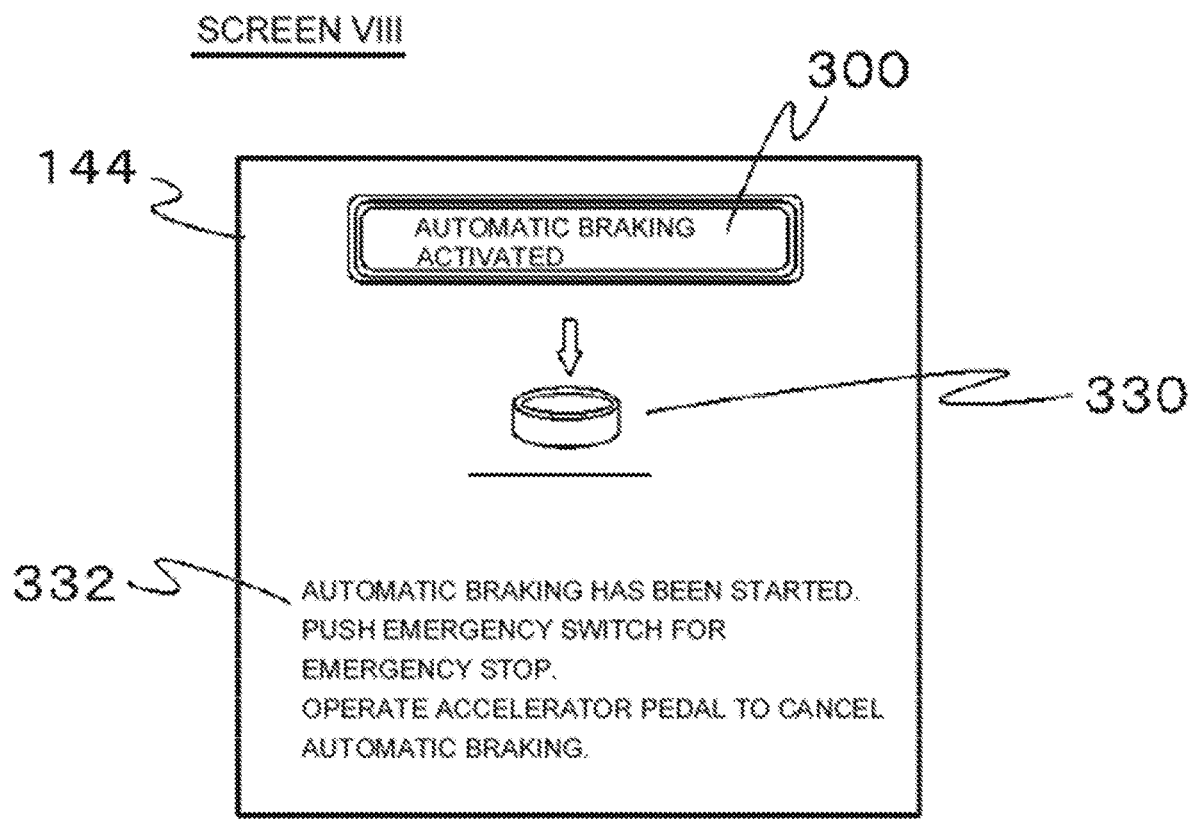
FIG. 3H is a diagram illustrating an example of a screen displayed on the display of the stop control device of the present invention.

After displaying screen VIII of FIG. 3H (i.e., after transmission of unable-to-drive state detection signal from unable-to-drive state detection unit 172), if the driver pushes the emergency switch 122, the stop control unit 176 receives a stop intention detection signal from the stop intention detection unit 170, starts emergency braking (deceleration at second deceleration speed), and also transmits "information indicating that emergency braking has been started" (C3) to the state display unit 174. Then, upon receipt of the information C3, the state display unit 174 displays screen III of FIG. 3C on the display 144. The progression in the screen of the display 144 after showing screen III of FIG. 3CB is as described in the above explanation of screen III of the aforementioned FIG. 3C.

On the other hand, after displaying screen VIII of FIG. 3H, if the driver operates the accelerator without pushing the emergency switch 122, upon receipt of the accelerator operation start signal from the unable-to-drive state detection unit 172, the stop control unit 176 cancels automatic braking, and also transmits "information indicating that automatic stop control has been cancelled" (C6) to the state display unit 174. Then, upon receipt of the information C6, the state display unit 174 displays screen VI of FIG. 3F.

Also, after displaying screen VIII of FIG. 3H, if the vehicle is stopped by automatic braking (deceleration at first deceleration speed) without pushing of the emergency switch 122 or an accelerator operation by the driver, the stop control unit 176 sets the vehicle to a parked state, and also transmits "information indicating that automatic stop of the vehicle has been completed" (C4) to the state display unit 174. Then, upon receipt of the information C4, the state display unit 174 displays screen IV of FIG. 3D on the display 144.

The stop control device 100 configured in the above manner detects pushing of the emergency switch 122 by the stop intention detection unit 170, and detects an unable-to-drive state (state in which accelerator pedal 114 is not operated for second predetermined time or longer) of the driver by the unable-to-drive state detection unit 172. Then, upon detection of any of the pushing of the emergency switch 122 and the unable-to-drive state, the stop control unit 176 performs deceleration at the first deceleration speed (automatic braking), and then upon detection of both of these, the stop control device performs deceleration at the second deceleration speed higher than the first deceleration speed (emergency braking).

The stop control device 100 uses the state display unit 174 to show, on the display 144, information (e.g., displayed texts 300, 310, 316, 322, 324) on the current state of the vehicle in the course of activation or cancellation of automatic braking or emergency braking, and information (e.g., displayed texts 302, 308, 312, 320, 328, 332 and icons 304, 314, 330) on the required operation for activation and/or cancellation of automatic braking or emergency braking in the current state.

With this, the stop control device 100 allows the driver to easily grasp, through the screen of the display 144, whether it has been determined to activate or cancel automatic stop control, and the required operation for activation and cancellation of automatic stop control. Hence, it is possible to suppress the driver's confusion when applying automatic stop control.

Next, an operation procedure of the stop control device 100 will be described with reference to a flowchart illustrated in FIG. 4. Note that in the following description, the determination of "whether the emergency switch 122 has been pushed" is made by determining whether a stop intention detection signal has been received from the stop intention detection unit 170, and the determination of "whether the driver is in an unable-to-drive state" is made by determining whether an unable-to-drive state detection signal has been received from the unable-to-drive state detection unit 172. Also, the determination of "whether accelerator non operation has been started" is made by determining whether an accelerator non operation-start signal has been received from the unable-to-drive state detection unit 172, and the determination of "whether an accelerator operation has been started" is made by determining whether an accelerator operation start signal has been received from the unable-to-drive state detection unit 172.

Figure 4:
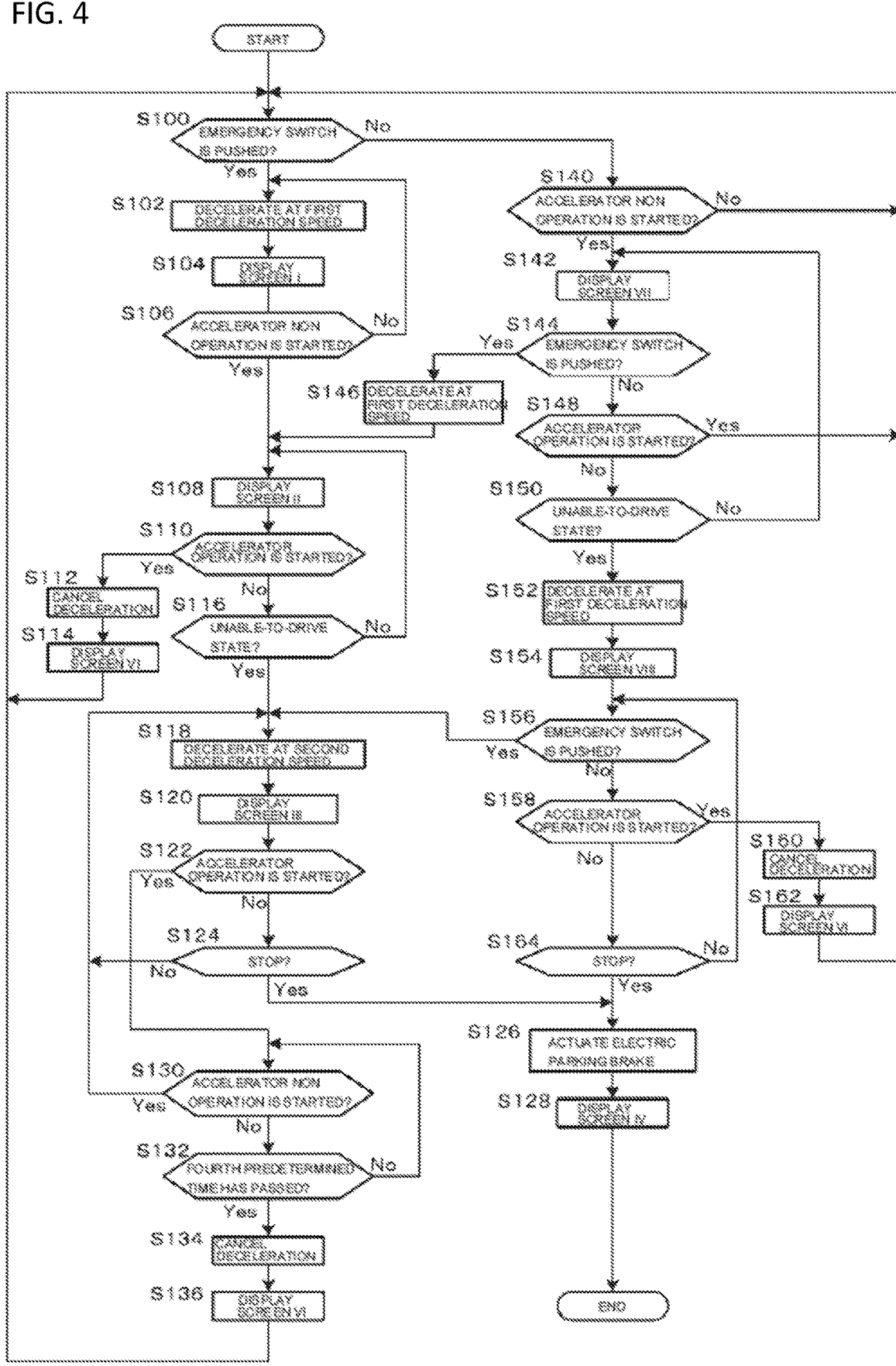
FIG. 4 is a flowchart illustrating a procedure of operations of the stop control device of the present invention.

The processing illustrated in the flowchart of FIG. 4 is started when the stop control device 100 is powered on.

When the processing is started, the stop control unit 176 determines whether the emergency switch 122 has been pushed (S100), and if it has been pushed (S100, Yes), the stop control unit starts deceleration at the first deceleration speed (i.e., automatic braking) (S102), and also transmits "information indicating that automatic braking has been started by detection of pushing of the emergency switch when the unable-to-drive state is not detected" (C1) to the state display unit 174. Upon receipt of the information C1, the state display unit 174 displays screen I illustrated in FIG. 3A on the display 144, through the AVC-ECU 142 (S104).

Next, the stop control unit 176 determines whether an accelerator non operation has been started (S106), and if the accelerator non operation has not been started (S106, No), the stop control unit returns to step S102 to repeat the processing. On the other hand, if the accelerator non operation has been started in step S106 (S106, Yes), the stop control unit transmits "information indicating that accelerator non operation has been started after pushing of the emergency switch" (C2) to the state display unit 174. Upon receipt of the information C2, the state display unit 174 displays screen II illustrated in FIG. 3B on the display 144 (S108). As described earlier, while displaying screen II, the state display unit 174 calculates the remaining time by subtracting the time elapsed after receipt of the above information C2 from the second predetermined time, and lights a lamp corresponding to the calculated remaining time in the icon 306.

Next, the stop control unit 176 determines whether an accelerator operation has been started (S110), and if it has been started (S110, Yes), the stop control unit cancels the deceleration at the first deceleration speed started in step S102 (3112), returns the vehicle to the normal driving state, and also transmits "information indicating that automatic stop control has been cancelled" (C6) to the state display unit 174. Upon receipt of the information C6, the state display unit 174 displays screen VI illustrated in FIG. 3F on the display 144 (S114). Thereafter, the stop control unit 176 returns to step S100 to repeat the processing.

On the other hand, if the accelerator operation has not been started (S110, No), the stop control unit determines whether the driver is in an unable-to-drive state (3116), and if he/she is not in an unable-to-drive state (3116, No), the stop control unit returns to step S108 to repeat the processing. On the other hand, if the driver is in an unable-to-drive state (S116, Yes), the stop control unit 176 starts deceleration at the second declaration speed (i.e., emergency braking) (S118), and transmits "information indicating that emergency braking has been started" (C3) to the state display unit 174. Upon receipt of the information C3, the state display unit 174 displays screen III illustrated in FIG. 3C on the display 144 (S120).

Next, the stop control unit 176 determines whether an accelerator operation has been started (S122), and if the accelerator operation has not been started (S122, No), the stop control unit determines whether the vehicle has stopped (S124). Then, if the vehicle has stopped (S124, Yes), the stop control unit 176 actuates the electric parking brake which is a part of the brake device 138 to set the vehicle to a parked state (S126), and then transmits "information indicating that automatic stop of the vehicle has been completed" (C4) to the state display unit 174. Upon receipt of the information C4, the state display unit 174 displays screen IV illustrated in FIG. 3D on the display 144 (S128), and completes the processing. Note that the determination of whether the vehicle has stopped may be made by acquiring a speed detection signal from the speed sensor 150 through the SENS-ECU 152, and determining whether the vehicle speed is zero.

Meanwhile, if the vehicle has not stopped in step S124 (S124, No), the stop control unit returns to step S118 and continues the deceleration at the second deceleration speed. Meanwhile, if an accelerator operation has been started in step S122 (S122, Yes), the stop control unit determines whether an accelerator non operation has been started thereafter (S130), and if the accelerator non operation has not been started (S130, No), the stop control unit determines whether the fourth predetermined time has passed after start of the accelerator operation in step S122 (S132). If the fourth predetermined time has passed (S132, Yes), the stop control unit cancels the deceleration at the second deceleration speed started in step S118 to return the vehicle to the normal driving (S134), and transmits "information indicating that automatic stop control has been cancelled" (C6) to the state display unit 174. Upon receipt of the information C6, the state display unit 174 displays screen VI illustrated in FIG. 3F on the display 144 (S136), and notifies the driver of cancellation of automatic stop control and the return to the normal driving state. Thereafter, the stop control unit 176 returns to step S100 to repeat the processing.

Meanwhile, if the fourth predetermined time has not passed in step S132 (S132, No), the stop control unit returns to step S130 to repeat the processing. Meanwhile, if the accelerator non operation has been started in step S130 (S130, Yes), the stop control unit returns to step S118 to repeat the processing, and continues the deceleration at the second deceleration speed.

Meanwhile, if the emergency switch 122 has not been pushed in step S100 (S100, No), the stop control unit determines whether accelerator non operation has been started (S140), and if it has been started (S140, Yes), the stop control unit 176 transmits "information indicating that the start of accelerator non operation has been detected when the emergency switch is not pushed" (C7) to the state display unit 174. Upon receipt of the information C7, the state display unit 174 displays screen VII illustrated in FIG. 3G on the display 144 (S142). As described earlier, while displaying screen VII, the state display unit 174 calculates the remaining time by subtracting the time elapsed after receipt of the above information C7 from the second predetermined time, and lights a lamp corresponding to the remaining time in the icon 306.

Next, the stop control unit 176 determines whether the emergency switch 122 has been pushed (S144), and if the emergency switch 122 has been pushed (S144, Yes), the stop control unit starts deceleration at the first deceleration speed (S146), and returns the processing to step S108.

On the other hand, if the emergency switch 122 has not been pushed in step S144 (S144, No), the stop control unit 176 determines whether an accelerator operation has been started (S148), and if it has been started (S148, Yes), the stop control unit returns to step S100 to repeat the processing.

On the other hand, if the accelerator operation has not been started in step S148 (S148, No), the stop control unit 176 determines whether the driver is in an unable-to-drive state (S150), and if he/she is in an unable-to-drive state (S150, Yes), the stop control unit start deceleration at the first deceleration speed (S152), and also transmits "information indicating that automatic braking (deceleration at first deceleration speed) has been started by detection of an unable-to-drive state when pushing of the emergency switch is not detected" (C8) to the state display unit 174. Upon receipt of the information C8, the state display unit 174 displays screen VIII illustrated in FIG. 3H on the display 144 (S154).

Meanwhile, if the driver is not in an unable-to-drive state in step S150 (S150, No), the stop control unit 176 returns to step S142 to repeat the processing. Thus, after detection of the start of accelerator non operation in step S140, deceleration at the first deceleration speed is started upon detection of any of pressing of the emergency switch 122 and the unable-to-drive state.

Next, the stop control unit 176 determines whether the emergency switch 122 has been pushed (S156), and if it has been pushed (S156, Yes), the stop control unit proceeds to the processing of step S118 and starts deceleration at the second declaration speed. On the other hand, if the emergency switch 122 has not been pushed in step S156 (S156, No), the stop control unit 176 determines whether an accelerator operation has been started (S158), and if it has been started (S158, Yes), the stop control unit cancels the deceleration at the first deceleration speed started in step S152 to return the vehicle to the normal driving state (S160), and also transmits "information indicating that automatic stop control has been cancelled" (C6) to the state display unit 174. Upon receipt of the information C6, the state display unit 174 displays screen VI illustrated in FIG. 3F on the display 144 (S162), and notifies the driver of cancellation of automatic stop control and the return to the normal driving state. Thereafter, the stop control unit 176 returns to step S100 to repeat the processing.

Meanwhile, if the accelerator operation has not been started in step S158 (S158, No), the stop control unit determines whether the vehicle has stopped (S164). If the vehicle has not stopped (S164, No), the stop control unit returns to step S156 to repeat the processing, and if it has stopped (S164, Yes), the stop control unit proceeds to the processing of step S126.

As has been described, in the embodiment, the state display unit 174 shows, on the display 144, information on operations of automatic stop control in the stop control unit 176 and whether it has been determined to activate or cancel the control, and/or information on the required operation for activation and/or cancellation of automatic braking and emergency braking in the current state. Hence, even when the driver is no longer able to perform the driving operation due to his/her health condition, he/she can easily grasp, from the screen shown on the display 144, the current state of the vehicle, and the required operation and time for which to maintain the operation for activation or cancellation of automatic stop control in the current state. As a result, it is possible to suppress confusion of the driver that may be caused in relation to an activation or cancellation timing of automatic stop control.

Note that in the embodiment, the stop control device 100 is configured as an electronic control unit (ECU), and exchanges data with the ECU 116 or the like provided in the vehicle, by wire communication through the bus 112 and the wire communication IF 102. Note, however, that the embodiment is not limited to this, and the stop control device 100 may be a portable communication device such as a smart phone, for example, which includes a wireless communication IF for performing wireless communication (e.g., Bluetooth (registered trademark) and Wi-Fi) instead of the wire communication IF 102, and exchanges data with the ECU 116 or the like installed in the vehicle directly or indirectly by wireless communication. In this case, the vehicle includes a wireless communication ECU connected and capable of communicating with the ECU 116 or the like by wire communication. The stop control device 100 may perform wireless communication with this wireless communication ECU, and exchange data with the ECU 116 or the like through this wireless communication ECU.

Also, in the embodiment, the display 144 shows information on operations of automatic stop control and whether it has been determined to activate or cancel the control, information on the required operation and/or the remaining time for which to maintain the operation for activation and/or cancellation of automatic braking and emergency braking in the current state. In addition to or instead of this, these pieces of information may be output from the speaker 146 as voice information.

Moreover, in the embodiment, a stop intention of the driver is detected by pushing of the emergency switch 122 by the driver. However, if a stop intention of the driver is detectable by an event other than operation of the brake in the normal driving operation, another means or method may be used to detect the stop intention of the driver. For example, assume that a camera provided inside the vehicle compartment detects absence or presence of an abnormal state of the driver, and the driver intends to stop when in an abnormal state. In this case, detection of the abnormal state may be regarded as detection of a stop intention of the driver. Examples of the abnormal state include: a state in which the frequency of blinking of the driver is higher than a predetermined frequency; a state in which the driver shakes his/her head more frequently than a predetermined frequency to keep awake; a state in which the driver's eyes are closed for a predetermined time or longer; and a state in which the driver is facing a direction other than the vehicle front for a predetermined time or longer.

The invention claimed is:

1. A stop control device comprising:
   a stop intention detector configured to detect a stop intention of a driver which indicates the driver's intention to stop a vehicle when the vehicle is traveling;
   an unable-to-drive state detector configured to detect that the driver is in an unable-to-drive state which indicates that the driver is considered unable to continue to drive the vehicle;
   a stop controller configured to perform automatic stop control which decelerates and stops the vehicle in a controlled manner, when said stop intention and/or said unable-to-drive state is detected; and
   a state display device configured to display, on a display, information indicating at least one of states which comprise an activation state of said automatic stop control, an operation state of the automatic stop control, and an inactivation state of the automatic stop control,
   wherein said stop controller starts the deceleration of the vehicle at a first deceleration speed upon the detection of any one of said stop intention and said unable-to-drive state, and starts the deceleration at a second deceleration speed higher than the first deceleration speed upon the detections of both of said stop intention and said unable-to-drive state.

2. The stop control device according to claim 1, wherein said unable-to-drive detector determines whether the driver is in the unable-to-drive state based on an operation state of an accelerator which is operated by said driver.

3. The stop control device according to claim 1, wherein said stop intention detector detects the stop intention of said driver based on whether a predetermined switch provided inside the vehicle is turned on.

4. The stop control device according to claim 1, wherein said state display device displays, on said display, information of an operation required for the driver to activate or inactivate said automatic stop control so as to change a current state of the automatic stop control.

5. The stop control device according to claim 4, wherein said state display device displays, on said display, a remaining time for which to maintain said required operation before the activation or inactivation of said automatic stop control changes the current state.

6. A vehicle comprising the stop control device according to claim 1.

7. A stop control device comprising:
   a communication interface for communicating with an onboard device of a vehicle; and
   a processor that processes data acquired from the onboard device through said communication interface, wherein said processor is configured to
   detect a stop intention of a driver which indicates the driver's intention to stop the vehicle when the vehicle is traveling and/or an unable-to-drive state of said driver which indicates that the driver is considered unable to continue to drive the vehicle, based on said data,
   perform automatic stop control which decelerates and stops the vehicle in a controlled manner, when said stop intention and/or said unable-to-drive state is detected, wherein said processor starts the deceleration of the vehicle at a first deceleration speed upon the detection of any one of said stop intention and said unable-to-drive state and starts the deceleration at a second deceleration speed higher than the first deceleration speed upon the detections of both of said stop intention and said unable-to-drive state, and
   display, on a display, information indicating at least one of states which comprise an activation state of said automatic stop control, an operation state of the automatic stop control, and an inactivation state of the automatic stop control.

8. A method of automatically stopping a vehicle, the method comprising the steps of:

acquiring data from an onboard device of the vehicle through a communication interface;

detecting a stop intention of a driver which indicates the driver's intention to stop the vehicle when the vehicle is traveling and/or an unable-to-drive state of said driver which indicates that the driver is considered unable to continue to drive the vehicle, based on said acquired data;

performing automatic stop control which decelerates and stops the vehicle in a controlled manner by starting the deceleration of the vehicle at a first deceleration speed upon the detection of any one of said stop intention and said unable-to-drive state and starting the deceleration at a second deceleration speed higher than the first deceleration speed upon the detections of both of said stop intention and said unable-to-drive state, when said stop intention and/or said unable-to-drive state is detected; and displaying, on a display, information indicating at least one of states which comprise an activation state of said automatic stop control, an operation state of the automatic stop control, and an inactivation state of the automatic stop control.

\* \* \* \* \*